United States Patent [19]

Norcross

[11] 4,130,931
[45] Dec. 26, 1978

[54] ELECTROSLAG BOSS AND PROCESS

[75] Inventor: James E. Norcross, Media, Pa.

[73] Assignee: Arcos Corporation, Philadelphia, Pa.

[21] Appl. No.: 657,325

[22] Filed: Feb. 11, 1976

[51] Int. Cl.² ................................. B22D 11/126
[52] U.S. Cl. ........................... 29/527.5; 228/165;
29/530; 29/400 C; 219/73; 219/73.1;
164/DIG. 12; 164/332; 164/334; 164/98;
164/106; 164/102; 249/96
[58] Field of Search .......... 228/165, 174, 119, 242;
219/73, 76; 29/530, 401 R, 401, 402, 401 C, 401
E, 400 C, 527.5; 164/332, 334, 91, 92, 98,
100–106, 111, 112, DIG. 12; 249/90, 96, 97

[56] References Cited

U.S. PATENT DOCUMENTS

| 1,335,875 | 4/1930 | Churchward | 29/402 |
| 1,795,332 | 3/1931 | Deppeler | 249/96 |
| 2,293,163 | 8/1942 | Morris | 219/73 R |
| 2,331,937 | 10/1943 | Schreiner | 219/73 R |
| 3,070,874 | 1/1963 | Davis, Jr. | 29/157 |
| 3,128,365 | 4/1964 | Schilberg | 29/530 |
| 3,446,931 | 5/1969 | Nakai et al. | 219/73 |
| 3,517,155 | 6/1970 | Mantel et al. | 219/73 |
| 3,550,259 | 12/1970 | Smith | 29/527.6 |

FOREIGN PATENT DOCUMENTS

| 5012648 | 8/1970 | Japan | 219/73 A |
| 898333 | 6/1962 | United Kingdom. | |

Primary Examiner—Lowell A. Lanson
Assistant Examiner—V. K. Rising
Attorney, Agent, or Firm—Alexis Barron

[57] ABSTRACT

In pipes and the like of relatively heavy section, a boss is formed on the side of the pipe or section by drilling a hole in the pipe, forming a mold around the hole with the hole in relatively vertical position and depositing in the mold and against the walls of the pipe, thereby joining to those walls, electroslag metal which forms a boss on the pipe.

11 Claims, 7 Drawing Figures

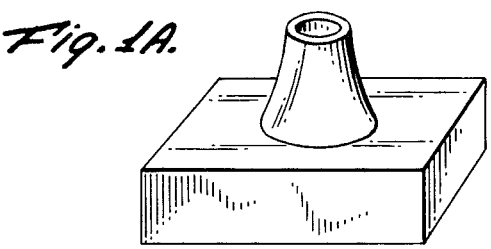
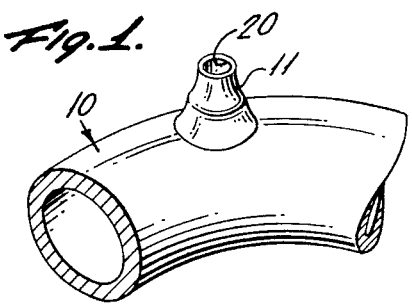
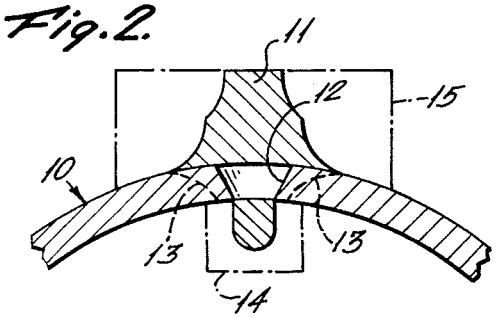
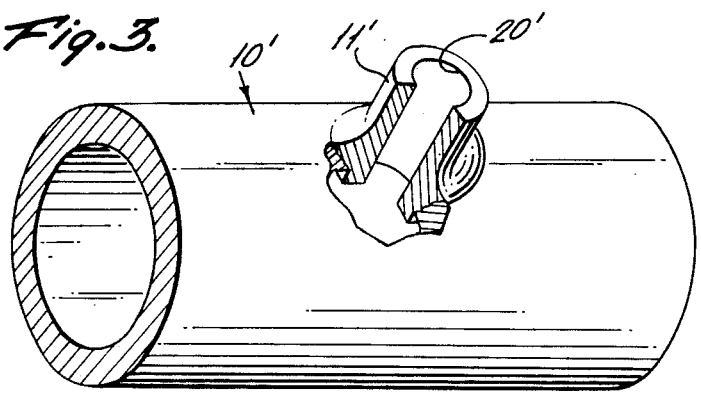
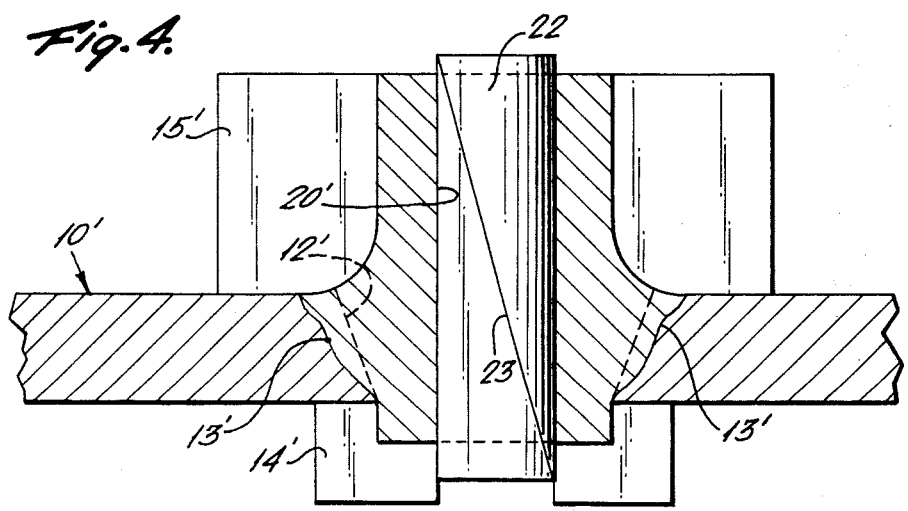

ELECTROSLAG BOSS AND PROCESS

CROSS REFERENCE TO RELATED APPLICATION

This is a continuation-in-part of application Ser. No. 468,239, filed May 9, 1974, now abandoned.

FIELD OF THE INVENTION

This invention relates to forming on a relatively thick metal section a boss such as, for example, a nozzle, by use of the electroslag welding technique.

Reported Developments

In metallic construction involving high integrity, nozzles and other projections required to accommodate pipe or other attachments in pressure vessels and the like are normally fusion welded to the surface, with the weld fully penetrating either the base metal or the nozzle, and subsequently a fillet is formed between the nozzle and the base metal. In thick weldments, this is a costly procedure, especially where radiographically sound joints are specified. Nozzles have been formed on relatively heavy section pipes from electroslag melted metal which flows against and unites to the exterior surface of the pipe, as shown in U.S. Pat. No. 3,550,259 to J. W. Smith and entitled "Nipple or Nozzle Buildup By The Electroslag Consumable Nozzle Technique." This patent shows the formation of a nipple or nozzle on a metallic member, such as a pipe, from metal produced by electroslag welding and in a manner such that a joint is formed between the electroslag metal comprising the nipple or nozzle and the base metal comprising the metallic member. The development described in this patent produces a joint which is completely between the top surface of the metallic member or pipe and the nipple or nozzle, that is, it is completely a surface joint. It has been found that such surface joints are not well integrated metallurgically and that the joint has a tendency to crack. This, of course, is undesirable. Furthermore, it is virtually impossible to produce by the method described in this patent a metallurgical bond across the entire cross section, let alone a fillet, so often required by engineering designs, which is satisfactorily bonded to the base metal.

The present invention relates to an improved method for forming a boss, such as a nozzle, on a base metal utilizing electroslag welding in a manner such that there is a complete metallurgical bond of the boss to the base metal, offering little or no tendency of cracking at the places where the boss and base metal are joined. This invention relates also to an improved boss formed by electroslag welding.

BRIEF DESCRIPTION OF THE INVENTION

In accordance with this invention, there is provided an improvement in the process wherein a metallic boss is joined to a metal base by building up thereon a weld metal deposit formed from electroslag welding, the improvement comprising providing a metal base having therein a hole peripherally enclosed by metal of the base defining said hole, wherein prior to building up said weld metal deposit, said hole is filled with metal by forming molten metal in said hole, said molten metal being formed by depositing in said hole electroslag metal by electroslag welding within said hole and by melting metal from the portions of the base contiguous said hole with heat generated by said electroslag welding, and cooling said molten metal thereby metallurgically integrating said electroslag metal with metal of the base in the region of said hole.

In preferred form, the hole extends throughout the thickness of the base. By depositing electroslag metal in the hole, the bond between the electroslag deposited metal and the base metal extends all the way through the base metal and comprises firm and extensive metallurgical joints between the very clear electroslag deposited metal and the base metal.

The practice of the present invention avoids or drastically reduces the possibility of lamellar tearing within the base metal or cracking between the base metal and the boss. The boss can be drilled subsequently to form a center bore therethrough with little or no tendency for the drill to deviate or wander when drilling to produce a nozzle. Cracking in rolled steels having imperfections of a lamellar type occur whenever stresses are normal to the lamellae; the present invention takes advantage of the characteristic of the electroslag welding process wherein the shrinkage stresses are parallel to the lamellae and have little tendency to cause lamellar tearing. Inasmuch as the electroslag deposited metal of the boss is uniform and clean, it will be appreciated that the bond between the electroslag metal and the base metal extends all the way through the base metal so that the boss is in effect integrally joined throughout the thickness of the base metal.

Thus, in the formation of nozzles and nipples on pipes and the like, the invention offers very great advantages, both in the process of formation and in the finished boss and pipe combination. In the finished boss and pipe combination, it has all the advantages of the superior bond which is obtained between the new metal and the metal of the pipe. These include: low non-metallic inclusion levels; structural uniformity, even in alloy steels; improvement in fatigue strength of the metal of the boss; and improved ductility in the longitudinal and transverse sections.

The electroslag process produces very high quality metal from a great variety of alloys.

BRIEF DESCRIPTION OF THE DRAWINGS

FIG. 1 is a perspective view of a portion of a pipe having thereon a nozzle formed in accordance with the invention.

FIG. 2 is a section taken transversely of the pipe showing an intermediate stage in the formation of the nozzle according to the invention.

FIG. 3 is an elevational view of a pipe having an alternative form of a nozzle formed according to the invention, with a portion of the nozzle shown in section.

FIG. 4 is a fragmentary longitudinal section through the pipe of FIG. 3 and showing a mold used in making the nozzle of FIG. 3.

FIG. 1A is a view of an alternative embodiment in which the boss is applied to a plate instead of a pipe.

DETAILED DESCRIPTION OF THE INVENTION

Figure 5:
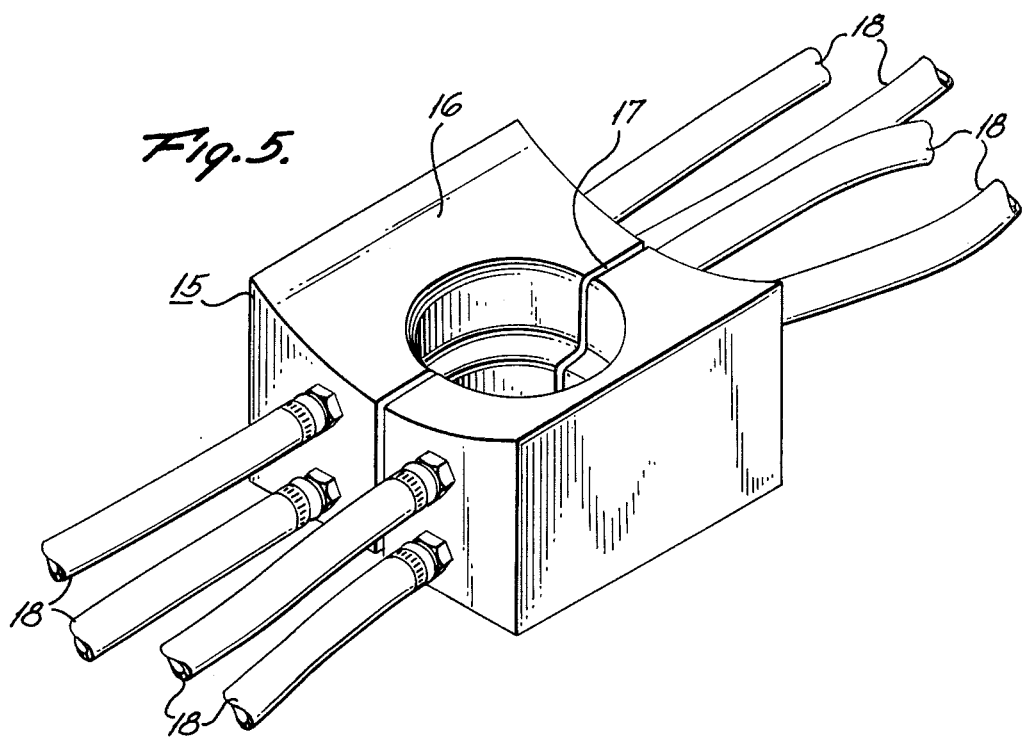
FIG. 5 is a perspective view, looking from the bottom, of a mold which may be used in practice of the invention.

FIG. 1 shows a pipe 10 having a boss 11 and an opening 20 in the boss 11 which is formed in accordance with the present invention. As to forming the boss 11 and with reference to FIG. 2, a tapered hole 12 is drilled in the pipe 10. Beneath the hole 12, a starting sump 14, made of copper or other suitable material, is placed against the underside of the pipe. A water-cooled mold 15, which is made of copper or other suitable material and which is curved at the bottom to mate with the top curved surface of the pipe 10, is placed on top of the hole 12. FIG. 5 shows the curved bottom surface 16 of the mold 15, which may be separated as shown at 17 and which is provided with water pipes 18 for ingress and egress of water for cooling molten metal which is formed in the mold 15. Molten metal is formed in the mold 15 by electroslag welding. The molten metal is formed initially in the starting sump 14, proceeding thereafter upwardly into and filling the hole 12, fusing as it does so to pipe 10. (For purposes of emphasis, the area of the hole 12 has been left without sectioning. It should be understood that the hole 12 is filled with metal as the electroslag welding process is carried out and that the welding process will deposit metal below and above the hole 12 in the embodiment shown in FIG. 2.) The molten metal in the hole 12 includes metal from the pipe wall defining the hole inasmuch as this metal is melted by the welding process. As the molten metal cools, a tapering merging area 13 is formed as shown in FIG. 2. The electroslag welding is continued until the mold 15 is filled with electroslag deposited metal. After the deposited metal is cooled, an opening 20 can be drilled in the boss 11 to convert it to a nozzle.

FIG. 3 shows a nozzle 11' with an opening 20' formed in place during the electroslag welding process. FIG. 4 shows a mold which can be used in forming the opening 20'. Initially, a tapered hole 12' is drilled in the base 10'. A removable starting mold 14' is placed beneath the hole 12' and a circular water-cooled mold 15' is placed on the top of the hole 12'. The cavity of the mold 15' is provided with a water-cooled, removable core mold 22 parted at 23. Molten metal produced by electroslag welding in the opening 12' and the cavity of the mold 15' forms around the core mold 22. As the molten metal cools, a tapering merging area 13' is formed. When the molten metal has cooled to the desired extent, the core mold 22 is removed from the cavity of the mold 15'. Alternatively, the core mold may be made in one piece and tapered slightly for ease of removal. Thus, the opening 20' (shown in FIG. 3) is produced in place during the electroslag welding process.

Figure 6:
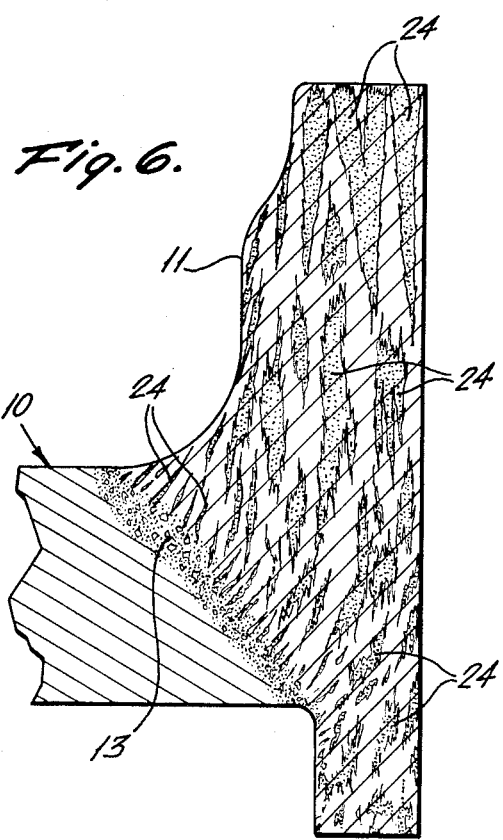
FIG. 6 is an enlarged fragmentary sectional view of a boss such as illustrated in FIG. 1.

FIG. 6 is a cross section of a nickel-chromium alloy at the axial center line of a boss 11 where it joins pipe 10 showing the macro-structure of the boss 11 which has a fusion line 13, as shown in FIG. 2. The dendrites 24 flow up, as shown. It will be seen that the direction of the dendrite flow is generally parallel to the boss axis, with the metal of the boss and the metal of the pipe being similar materials. The dendrites so formed in this direction add structural strength in the direction of loading. According to the invention the boss is formed in situ and the electroslag deposited metal extends through the pipe, joins the wall of the pipe and integrates with the metal of the wall of the pipe.

The term "electroslag welding" as used herein refers to a well-known welding process. Electroslag welding is a cold-starting process which is begun by establishing an electric arc at the end of an electrode. However, when a sufficiently thick layer of hot molten slag is formed, all arc action stops and the current passes from the electrode, which is submerged in the molten slag, to the base metal through the conductive molten slag. The slag is maintained in the molten state and the electrode is melted, thereby producing additional molten metal, be heat generated by the resistance the molten slag offers to the current. In forming a boss according to the present invention, the molten metal in the hole of the base metal includes metal from the electrode and also base metal contiguous the hole, the latter also being melted by the heat generated. It will be appreciated that as the molten metal in the region of the hole cools, there is obtained a metallurgical bond between the metal deposited from the electrode and the metal of the base in the region of the hole.

Various methods of the electroslag welding techniques can be used in forming the boss of the present invention. For example, the boss can be formed utilizing the conventional wire process in which electroslag metal is formed from an electrode which is consumed by heat during the welding process. Or, the consumable guide method can be used in which the electrode is positioned in a metal guide tube which is also a source of electroslag metal as it is consumed by heat during the welding process. The boss can be formed also using a consumable plate or cylindrical electrode.

The term "electroslag deposited metal" when used herein refers to metal which includes metal deposited from an electrode, with or without a consumable metal guide tube during electroslag welding.

The boss formed in accordance with the present invention protrudes from the surface of the metal base and can be of any suitable shape to perform the function desired. For example, nipples, nozzles and branch connections can be formed in accordance with the present invention. By way of example, it is noted that bosses 3 to 12 inches high and 4 to 5 inches in diameter can be formed utilizing the present invention. It should be understood that the boss is not a "weld reinforcement" (a commonly used term to describe supplementary weld metal in excess of the base metal thickness) inasmuch as the electroslag metal comprising the boss is not deposited for the purpose of joining two metal base pieces together. It is deposited for the purpose of building up on a metal base a protruding part which itself is functional or which can be converted to a functional part, for example, by drilling an opening through a solid boss to convert it to a nozzle.

Compared to the prior art, in which a boss is formed by electroslag welding, the present invention can be used to particularly good advantage in forming a boss on a metal base having a curved surface such as, for example, the convex surface of a pipe, as described in detail hereinabove. In the prior art method of the patent referred to above, forming the boss on the curved pipe surface aggravates the tendency of the joint between the boss and the pipe surface to crack. This also occurs when forming a boss on a flat surface. Separation of the boss from the surface is particularly severe around the periphery of the boss and can be overcome when using the aforementioned prior art method by separate additional steps of mechanically removing the unfused metal and depositing weld metal by conventional methods. Metallurgically bonding the boss to the wall of the pipe defining the hole in the pipe according to the present invention avoids this problem entirely and also offers the opportunity of providing a satisfactorily bonded fillet, which, as mentioned above, is not possible to produce in the prior art method.

It should be understood that the present invention can also be used to good advantage in forming a boss on other types of surfaces, for example, on a flat surface such as the plate shown in FIG. 1A.

In general, the boss is formed on a relatively thick metal base, that is, a base sufficiently thick to withstand considerable melting by the heat generated from the electroslag welding process. Typically, the base should be at least about ¾ inch in thickness. If somewhat thinner metal bases are used, precautions should be taken to provide sufficient cooling to keep the base metal from excessively melting beyond the desired amount for fusion with the boss.

The surface area of the hole in the metal base may by substantially equal to or larger or smaller than the horizontal cross-sectional area of the base portion of the boss, that is, the portion of the boss at the top surface of the metal base. It is preferred that the surface opening of the hole in the metal base be smaller than the area of the base portion of the boss. The reason for this is that a smooth fillet at the periphery of the boss is formed when the heat of the molten metal melts that portion of the base metal extending outwardly from the hole and beneath the mold. (For example, see FIG. 4, reference numerals 12' and 13'.)

It will be noted that FIGS. 2 and 4 show the use of a tapered hole in the pipe wall, with the diameter of the hole decreasing progressively from the top to the bottom of the pipe wall. The use of such a downwardly tapered hole has certain advantages. For example, compared to a hole formed by vertical side walls, the taper provides a greater surface area of pipe wall which can be metallurgically bonded to the electroslag metal comprising the boss, thereby adding to the joint strength. Also, the use of a downwardly tapered hole is particularly advantageous in applications where it is desired that the horizontal cross-sectional area of the boss at the top surface of the metal base be relatively large to provide for fillet contours at this level. By way of explanation, it is noted that if the horizontal cross-sectional area of the hole is relatively large in the region of the bottom portion of the metal base, that is, the portion where molten electroslag metal is initially formed, desired fusion of the electroslag metal and the metal of the base wall may not be achieved because of a lack of sufficient heat to melt the metal wall. The use of a downwardly tapered hole avoids this problem because the heat, being confined to a smaller area, is sufficient to melt the metal wall defining the hole. It should be noted that as the electroslag welding process is continued and additional metal is deposited in the hole, there is sufficient heat buildup to melt the wall throughout its thickness, including the exterior surface of the metal base where the horizontal cross-sectional area of the hole and of the fused metal is desirably relatively large.

Embodiments of the present invention illustrated in the drawings show metal bases having holes extending entirely through the bases. There are applications in which the boss can be satisfactorily formed and metallurgically bonded to the metal base by utilizing a hole which extends part way through the base. Such a hole should have a depth such that there is sufficient wall surface to permit the formation of a sound metallurgical joint between the electroslag deposited metal and the metal of the base. The base, of course, must be sufficiently thick to accommodate a hole of the needed depth. When utilizing a hole which extends part way through the base, it is recommended that the hole be downwardly tapered and that the base of the hole be rounded, with the area at the base being relatively small. Areas of incomplete fusion between the wall of the hole and the electroslag deposited metal may be present in the region of the base of the hole. (At the start of the welding process and before the stable electroslag conditions are established, there may not be enough heat generated to sufficiently melt the wall of the hole.) Such areas may be removed when the boss is drilled to form the nozzle. When utilizing this form of the invention, water cooling of the internal surface can be used and the need for using cooling at the starting surface can be avoided.

Although the hole in the metal base may be of any desired shape, it is believed to be simplest to provide the base with a hole circular in cross-section, and preferably tapering downwardly. The cavity in the mold in which the boss is formed can be of any size or shape for producing a boss having the desired contour and also a fillet of desired contour. The present invention can be used to form bosses on a variety of types of metal and metal alloys and the boss itself can be formed from a variety of different metals and metal alloys. For example, metals such as steel, copper, copper alloys and nickel alloys, including cupronickel alloys, can be used. These are but a few examples of the metals and metal alloys which can be used.

In summary, practice of the present invention provides the means for forming an electroslag deposited metal boss on a metal base in a manner such that extensive surface and internal metallurgical bonds are formed between the electroslag metal and the metal of the base. This results in an improved structure which is metallurgically sound and resistant to cracking. And the results can be achieved in a relatively simple and uncomplicated manner.

I claim:

1. In the process wherein a metallic boss is joined to a metal base by building up on the base a weld metal deposit formed from electroslag welding, the improvement comprising forming said metallic boss by providing a metal base having therein a hole completely peripherally enclosed by metal of the base defining said hole, wherein prior to building up said weld metal deposit, said hole is filled with metal by forming molten metal in said hole, said molten metal being formed in said hole from electroslag deposited metal and from the melting of portions of the base contiguous said hole with heat generated by said electroslag welding, and cooling said molten metal thereby metallurgically integrating said electroslag metal with metal of the base in the region of said hole, thereby forming said metallic boss which protrudes from said base.

2. A process according to claim 1 wherein said hole extends throughout the thickness of said base and including supporting said molten metal in said hole from the underside of said base.

3. A process according to claim 2 wherein said metal base is the convex surface of a pipe wall and joining said metallic boss to said surface as set forth.

4. A process according to claim 2 including forming said molten metal around a core.

5. A process according to claim 4 including removing said core thereby providing a boss with an opening therethrough.

6. A process according to claim 2 wherein said hole is circular in cross-section and downwardly tapered.

7. In the process wherein a metallic boss is joined to the convex surface of a metal pipe wall having a topside and an underside by building up on said wall a weld metal deposit formed from electroslag welding, the improvement comprising forming said metallic boss by providing a pipe wall having therein a downwardly tapered hole which is circular in cross-section and completely peripherally enclosed by metal of the pipe wall defining said hole, and said hole extending throughout the thickness of said wall, wherein prior to building up said weld metal deposit, said hole is filled with metal by forming molten metal in said hole, and supporting said molten metal in said hole from the underside of said wall, said molten metal being formed in said hole from electroslag deposited metal and from the melting of portions of the wall contiguous said hole with heat generated by said electroslag welding, and cooling said molten metal thereby metallurgically integrating said electroslag metal with metal of the wall in the region of said hole, thereby forming said metallic boss which protrudes from said wall.

8. A process according to claim 7 including forming said boss with a fillet by providing said pipe wall with a hole having a surface opening at the topside of the pipe wall smaller than the portion of the boss at the place where it is joined to said surface, and forming said boss so that at the place where it is joined to said surface, it is larger than said surface opening.

9. In the process wherein a metallic boss having a fillet is joined to a metal base by building up on the base a weld metal deposit formed from electroslag welding, the improvement comprising forming said boss by providing a metal base having therein a hole completely peripherally enclosed by metal of the base defining said hole and having a surface opening smaller than the portion of the boss at the place where it is joined to the metal base, wherein prior to building up said weld metal deposit, said hole is filled with metal by forming molten metal in said hole with heat generated by said electroslag welding, said molten metal being formed in said hole from electroslag deposited metal and from the melting of portions of the base contiguous said hole, and including melting portions of the base extending outwardly from said surface opening with heat generated by said electroslag welding by forming said boss so that at the place where it is joined to said base, it is larger than said surface opening, and cooling said molten metal thereby metallurgically integrating said electroslag metal with metal of the base in the region of said hole and including the region of the base extending outwardly from said surface opening, thereby forming said metallic boss which protrudes from said base.

10. A process according to claim 9 wherein said hole is circular in cross-section and downwardly tapered.

11. A process according to claim 10 wherein said hole extends throughout the thickness of said base and including supporting said molten metal in said hole from the underside of said base.

* * * * *

UNITED STATES PATENT AND TRADEMARK OFFICE
CERTIFICATE OF CORRECTION

PATENT NO. : 4,130,931
DATED : December 26, 1978
INVENTOR(S) : James E. Norcross It is certified that error appears in the above-identified patent and that said Letters Patent are hereby corrected as shown below:

Column 2, line 9, "clear" should be -- clean --.

Column 2, line 25 "between the electroslag metal" should be -- between the electroslag deposited metal --.

Column 4, line 3, "be" should be -- by --.

Signed and Sealed this

Seventeenth Day of April 1979

[SEAL]

Attest:

RUTH C. MASON
Attesting Officer

DONALD W. BANNER
Commissioner of Patents and Trademarks